(12) United States Patent
Lee et al.

(10) Patent No.: US 7,528,715 B2
(45) Date of Patent: May 5, 2009

(54) METHOD FOR OPTIMAL MULTI-VEHICLE DISPATCH AND SYSTEM FOR THE SAME

(75) Inventors: Hokyung Lee, Daejeon (KR); Jongku Lee, Daejeon (KR); Jaein Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 295 days.

(21) Appl. No.: 11/651,536

(22) Filed: Jan. 10, 2007

(65) Prior Publication Data

US 2007/0194912 A1 Aug. 23, 2007

(30) Foreign Application Priority Data

Jan. 10, 2006 (KR) .................... 10-2006-0002488

(51) Int. Cl.
*G08B 1/08* (2006.01)
(52) U.S. Cl. .............................. 340/539.18
(58) Field of Classification Search ........... 340/539.18, 340/994, 998; 701/2, 117
See application file for complete search history.

(56) References Cited

U.S. PATENT DOCUMENTS

| | | | | |
|---|---|---|---|---|
| 5,122,959 A | * | 6/1992 | Nathanson et al. | 701/117 |
| 6,606,557 B2 | * | 8/2003 | Kotzin | 701/209 |
| 2004/0143466 A1 | * | 7/2004 | Smith et al. | 705/6 |

* cited by examiner

*Primary Examiner*—Phung Nguyen
(74) *Attorney, Agent, or Firm*—McKenna Long & Aldridge, LLP

(57) ABSTRACT

A vehicle dispatch system enables optimal dispatch of a plurality of vehicles with information of available vehicles from transportation company terminals and information of orders from client terminals under restrictive conditions such as vehicle sizes, minimum loading rates, and a maximum number of assignment locations, based on transportation regions preset in consideration of transportation times, past order quantities, and order congestion degrees, such that a relevant vehicle can perform delivery of freight within a predetermined transportation region to minimize a total transportation cost for each transportation region. The system minimizes a delivery distance of each vehicle, increases a loading volume of the vehicle to reduce an empty rate of vehicles, and minimizes the number of dispatched vehicles, thereby reducing the total transportation cost.

10 Claims, 6 Drawing Sheets

| | Assignment location index | | | | | | | |
|---|---|---|---|---|---|---|---|---|
| Order index | | 1 | 2 | 3 | 4 | ... | ... | m-1 | m |
| | 1 | 1 | 0 | 0 | 0 | ... | ... | 0 | 0 |
| | 2 | 1 | 0 | 0 | 0 | ... | ... | 0 | 0 |
| | 3 | 0 | 1 | 0 | 0 | ... | ... | 0 | 0 |
| | : | : | : | : | : | : | : | 0 | 0 |
| | n-1 | 0 | 0 | 0 | 0 | 0 | 0 | 1 | 0 |
| | n | 0 | 0 | 0 | 0 | 0 | 0 | 0 | 1 |

| | Transportation region index | | | | | | | |
|---|---|---|---|---|---|---|---|---|
| Order index | | 1 | 2 | 3 | 4 | ... | ... | k-1 | k |
| | 1 | 1 | 0 | 0 | 0 | ... | ... | 0 | 0 |
| | 2 | 1 | 0 | 0 | 0 | ... | ... | 0 | 0 |
| | 3 | 0 | 1 | 0 | 0 | ... | ... | 0 | 0 |
| | : | : | : | : | : | : | : | 0 | 0 |
| | n-1 | 0 | 0 | 0 | 0 | 0 | 0 | 1 | 0 |
| | n | 0 | 0 | 0 | 0 | 0 | 0 | 0 | 1 |

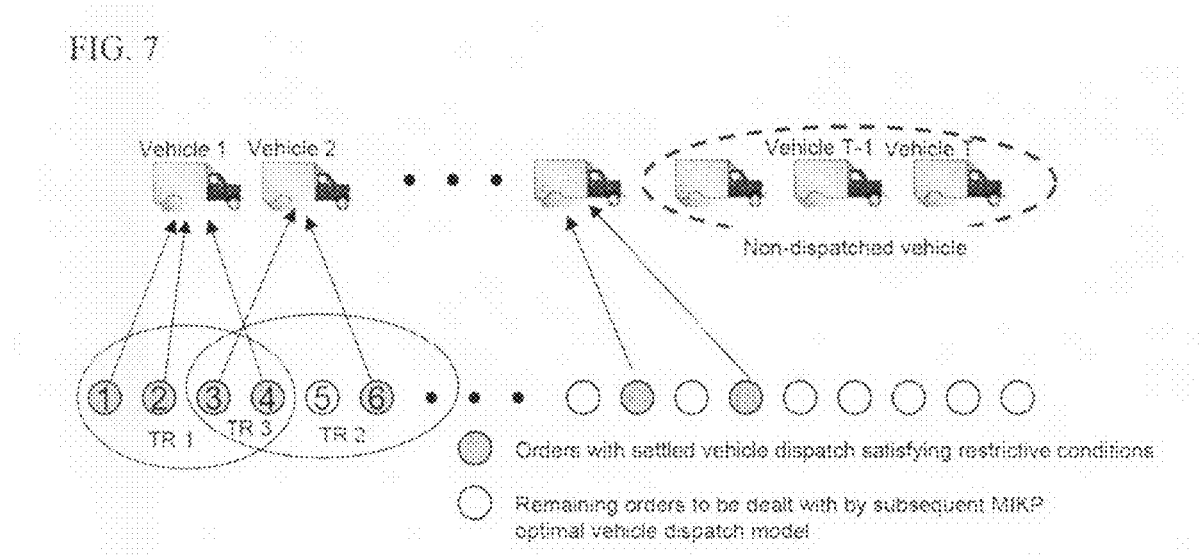

FIG. 9

METHOD FOR OPTIMAL MULTI-VEHICLE DISPATCH AND SYSTEM FOR THE SAME

This application claims the benefit of Korean Patent Application No. 10-2006-0002488, filed on Jan. 10, 2006, which is hereby incorporated by reference for all purposes as if fully set forth herein.

FIELD OF THE INVENTION

The present invention relates to a method and system for performing optimal dispatch of a plurality of vehicles, and, more particularly, to a vehicle dispatch system, which enables optimal dispatch of a plurality of vehicles with information of available vehicles from transportation company terminals and information of orders from client terminals under restrictive conditions of vehicle sizes, minimum loading rates, and a maximum number of assignment locations, based on transportation regions preset in consideration of transportation times, past order quantities, and congestion degrees of orders, such that relevant vehicles can perform delivery of freight within a predetermined single transportation region, minimizing a total transportation cost for each transportation region.

BACKGROUND OF THE INVENTION

Recent development in manufacturing industries enables mass production of goods with high productivity at lower costs, and is accompanied with an increase in consumption, causing an explosive increase in freight transportation. Such an increase in freight transportation is not only limited to the relationship between manufacturers and final consumers, but is also found in the relationship between the manufacturers and (in the relationship between the manufacturers and) intermediary consumers.

In particular, since the freight transportation between the manufacturers or between the manufacturers and the intermediary consumers is relatively large in quantity of delivery at a time, a transportation cost therebetween finally acts as one of the most important factors in determination of a prime cost.

Accordingly, there are needs of vehicle dispatch capable of achieving delivery of goods in an optimal condition, but various restrictive conditions, such as types, quantity, forwarding locations, and assignment locations of the goods for delivery, make it difficult to establish an optimal vehicle dispatch schedule which can satisfy all the restrictive conditions.

Due to a number of variables and restrictive conditions which must be considered prior to computing of the optimal vehicle dispatch schedule, the vehicle dispatch schedule has been usually established on the basis of field experiences of planners rather than an optimal solution obtained by use of mathematic programming or a computer system, causing low efficient vehicle dispatch in view of loading rates of vehicles, and a resultant increase in transportation cost.

In this regard, some of conventional techniques propose employment of computer systems and satellite tracking systems for automated and real-time vehicle dispatch.

Such conventional techniques have merits in the case where there are needs of rapid delivery of freight or in the case where there are needs of delivery of freight, which is ordered in a small quantity at a time and requires a single vehicle to pass by many assignment locations for the delivery of freight. Therefore, the conventional techniques are evaluated inappropriate for delivery of freight which is ordered in the larger quantity at a time and requires a long distance delivery. For example, when sending primary products to factories in several places for final machining of the primary products or when sending final products to wholesalers as intermediary consumers, the conventional techniques are inappropriate.

Accordingly, there are needs of the improvement in a method and system for performing optimal vehicle dispatch.

SUMMARY OF THE INVENTION

Therefore, the present invention has been made in a view of the above and other problems, and it is an aspect of the present invention to provide an optimal vehicle dispatch system, which minimizes a delivery distance of each vehicle, increases a loading volume of the vehicle to reduce an empty rate of vehicles, and minimizes the number of dispatched vehicles, thereby reducing a total transportation cost, when delivering a great quantity of goods to a plurality of relevant assignment locations with a plurality of vehicles.

In accordance with an aspect of the present invention, the above and other objects can be accomplished by the provision of a system for performing optimal vehicle dispatch, comprising: client terminals to supply information of orders; transportation company terminals to supply information of available vehicles; a management server for vehicle dispatch including a transportation region database, an order information database, an available vehicle information database, and a vehicle dispatch information database to perform optimal vehicle dispatch based on the information of orders from the client terminals and the information of available vehicles from the transportation company terminals; and a network for communication between the management server and the client terminals and between the management server and the transportation company terminals, wherein the management server for vehicle dispatch performs a process comprising: presetting a plurality of transportation regions including individual regions and superimposed regions, based on a transportation time condition and information of a past order quantity and a congestion degree of orders, followed by storing information of the plurality of preset transportation regions in the available vehicle database of the management server; receiving the information of orders including an order quantity and an assignment location of each order to store the information of orders in the order information database, and receiving the information of available vehicles including types and the number of available vehicles from the transportation company terminals to store the information of available vehicles in the available vehicle database of the management server; establishing a vehicle dispatch schedule optimized in order of high loading volumes of the vehicles under restrictive conditions of vehicle sizes, minimum loading rates, and a maximum number of assignment locations, based on the information of available vehicles and the information of orders, such that a relevant vehicle performs delivery of goods within a predetermined single transportation region to minimize a total transportation cost for each transportation region, followed by storing the vehicle dispatch schedule in the vehicle dispatch information database of the management server; and supplying information of the optimized vehicle dispatch schedule in the vehicle dispatch information database to the transportation company terminals.

According to the invention, when various types of orders for a number of goods are given from a number of client terminals, the vehicle dispatch schedule is established in order of the vehicles with higher loading volumes for the respective transportation companies through operation of the management server with the information of orders from the client terminals and the information of available vehicles from the transportation company terminals after presetting a transportation region for each relevant vehicle based on past order materials, so that the number of vehicles and a travel distance thereof required for delivery of the goods can be reduced, and a loading rate of the vehicles can be increased, thereby remarkably reducing the total transportation costs.

In the step of presetting the plurality of transportation regions, the term 'individual region' means one transportation region under independent management without being superimposed on other regions, and the term 'superimposed region' means one transportation region, which is superimposed with one another and permits an overlap operation of predetermined vehicles. For example, if the predetermined vehicle is permitted to provide service only within a particular transportation region, this particular transportation region becomes the individual region, and if the predetermined vehicle is permitted to provide the service within a particular transportation region or a portion thereof along with another vehicle pertaining to another transportation region, this particular transportation region becomes the superimposed region in view of the vehicles.

The transportation regions may be preset to include the individual regions and the superimposed regions in consideration of the three types of restrictive conditions as described above. These restrictive conditions will be described in detail hereinafter.

First, the transportation time condition may be set as an average transportation time per unit distance or an average transportation distance per unit time in consideration of a road network, traffic volume, road pavement condition, etc. For example, relevant regions requiring a predetermined average transportation time or less per unit time may be set as a single transportation region in view of time. Alternatively, other relevant regions requiring a predetermined average transportation time or less per unit distance may be set as the single transportation region in view of distance.

Second, the information of the past order quantity may be set as an average order quantity based on statistics of actual orders for past several years or months. For example, if a total average order quantity with respect to relevant regions is a predetermined value or less, these relevant regions may be set as the single transportation region. Of course, the average order quantity can be obtained as various average values, such as an arithmetic average, a geometrical average, etc., which are generally used in mathematics.

Third, the information of the congestion degree of orders may be set as an average ordering time calculated with statistics of ordering times for the past several years or months. For example, if a total average ordering time of relevant regions is a predetermined value or less, these relevant regions may be set as the single transportation region.

Although any standard for a time period of inspection with respect to the order quantity and the congestion degree of orders can be used without being limited to a particular period of inspection so long as it can provide significant data in terms of statistics, it is preferable that the standard for the time period of inspection is three years or more. However, if such significant data is difficult to obtain according to this standard, the standard for the time period of inspection may be set, for example, in the range of 3 months to 3 years.

The transportation regions may be determined in various manners in consideration of these three types of conditions in combination, and although each of the transportation regions basically constitutes the individual transportation region, the transportation regions may be superimposed on one another in view of the vehicle, if necessary. For example, if a predetermined region has given an average order quantity and/or an average ordering time no less than a predetermined value, this region may be set as the superimposed transportation region to allow conjunctional delivery with other adjacent regions.

Preferably, if a predetermined region as a city or district unit has given an order quantity no less than a predetermined value per month according to the information of the past order quantity, this region may be set as the superimposed transportation region in order to allow the conjunctional delivery with other adjacent regions.

More preferably, when considering the total order quantity along with the information of the congestion degree of orders, if a predetermined region has given the total order quantity per month no less than a predetermined value, this region may be set as the superimposed transportation region to allow the conjunctional delivery with other adjacent regions.

FIG. 1 is a diagram of transportation regions preset according to one embodiment of the present invention.

Referring to FIG. 1, a whole country is divided into a total of 28 transportation regions, each of which is preset as an individual region or a partially superimposed transportation region, in consideration of the various restrictive conditions as described above. As the superimposed transportation regions, a particular city or district given, for example, an order quantity of 1,000 tons or more per month is simultaneously included in two or more transportation regions, and regions given a total order quantity of 2,000 tons or more per month in a single transportation region are also simultaneously included in two or more transportation regions.

In the optimal vehicle dispatch system set forth in the above, the step of receiving and storing the information of orders and the step of supplying the information of the optimized vehicle dispatch schedule are performed in such a way of receiving the information transmitted from the client terminals and the transportation company terminals, and operating the management server for vehicle dispatch to transmit the established vehicle dispatch schedule to the transportation company terminals. In this regard, the system is preferably constructed to allow automatic receipt and transmission of the information via a network communication system. Since the network is well known to those skilled in the art, detailed description thereof will be omitted herein.

In regard to the order quantities and the assignment locations of the orders transmitted from the client terminals, the delivery order may be given from deliver one or more types of goods in different quantities to one or more assignment locations, which can be included in the single transportation region, or which can be distributed to two or more transportation regions.

In regard to the types and number of available vehicles, being the information transmitted from the transportation company terminals, the types of vehicles may be classified according to the types of goods and the loading volume. Generally, as the vehicle increases in loading volume, a transportation cost per weight of the goods is lowered. Accordingly, the loading volume of the vehicle acts as one of the important factors for optimization of vehicle dispatch described as follows.

At the step of establishing the optimized vehicle dispatch schedule, the optimal vehicle dispatch is performed under the various restrictive conditions to minimize a total transportation cost for each transportation region. One vehicle is in charge of delivering the goods only within a single individual transportation region or only within a single superimposed transportation region, to which one or more vehicles are dispatched. By allowing a particular vehicle to perform delivery of the goods only within such a single transportation region, it is possible to achieve an effective delivery of the goods within the transportation region, which has been optimally preset in consideration of the transportation time condition and the like, as described above.

To achieve effective vehicle dispatch such that the vehicles can be dispatched in a high loading rate to the single transportation region, the vehicle sizes, the minimum loading volumes, and the maximum number of assignment locations are considered as the restrictive conditions in computing of the optimized vehicle dispatch schedule, as described above. The exemplary restrictive conditions are described in detail hereinafter.

First, since the loading volume of each vehicle is fixed, the vehicle size will determine the maximum number of goods which can be loaded on the vehicle. For example, the vehicle sizes are prescribed as 25 tons, 18 tons, 15 tons, 9 tons, 5 tons, 4.5 tons, 4 tons, etc., and in this case, a loading volume for a 18 ton-vehicle wiH be set so as not to exceed 18 tons.

Second, to reduce an empty rate of each vehicle, the minimum loading rate will be set to allow the loading volume of each vehicle to be a predetermined value or more. For example, the minimum loading rate is set such that each vehicle has a loading rate of at least 95%.

Third, the maximum number of assignment locations is set to suggest a predetermined number or less of assignment locations which can be circulated by one vehicle. For example, the maximum number of assignment locations is set to allow one vehicle to circulate only four or less assignment locations, thereby preventing increases in delivery time and consolidation cost resulting from circulation of too many assignment locations.

As described above, since the greater the loading volume of the vehicle, the higher a transportation cost reduction effect becomes, the system may be configured to make the vehicle dispatch schedule such that, if an order quantity for one assignment location approaches 100% of the loading volume of a vehicle having the maximum loading volume among the available vehicles, this vehicle is preferentially dispatched to that assignment location. Additionally, the system may be configured to make the vehicle dispatch schedule such that, if a total order quantity for 2~4 assignment locations within a single transportation region approaches 100% of the loading volume of the vehicle having the maximum loading volume among the available vehicles, this vehicle is preferentially dispatched to that transportation region. Such a preferential vehicle dispatch operation ensures an optimal loading rate, and provides an effect of reducing a load of calculation for subsequent vehicle dispatch.

It is preferable that the optimal vehicle dispatch is determined according to a mixed integer linear programming (MILP) model, which comprises linear equations expressed by the restrictive conditions and an objective function for minimization of the total transportation cost. The MILP model refers to mathematical programming, which systematically selects the value of real or integer variables from a set of decision-making variables that denote optimal solutions.

Such an MILP model may be deduced by obtaining an automatic vehicle dispatch solution that maximizes an objective function (obj) expressed by the following Equation 1, which is directed to preferential employment of large vehicles with relatively high loading volumes and low transportation charges as described above.

$$obj = \sum_{i,t,k} OD(i)BTM(i, t, k), \qquad (1)$$

where "i" denotes an order, "t" denotes a vehicle, "k" denotes a transportation region, "BTM(i,t,k)" is 0 or 1, and OD(i) denotes an order quantity of an i-th order.

As an example of the binary transport matrix (BMT), "BMT(1,2,4)=1/0" means that an order of "1" within a transportation region of "4" is dispatched/not dispatched to a vehicle of "2." Accordingly, by obtaining the automatic vehicle dispatch solution that maximizes the value of obj in an individual MILP model while satisfying the restrictive conditions of the MILP model, it is possible to maximize an employment rate of the large vehicles which require low transportation costs, enabling minimization of the total transportation cost.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a diagram illustrating results of vehicle dispatch with respect to T vehicles by the MILP model according to one embodiment of the present invention;

FIG. 8 shows binary matrixes of results of vehicle dispatch with respect to Vehicles 1 and 2 among the results of the vehicle dispatch shown in FIG. 7; and FIG. 9 illustrates a result of vehicle dispatch with respect to 25-ton vehicles among the results of the vehicle dispatch according to one embodiment of the present invention.

DETAILED DESCRIPTION OF PREFERRED EMBODIMENTS

Exemplary embodiments of the present invention will be described with reference to the accompanying drawings.

Figure 2:
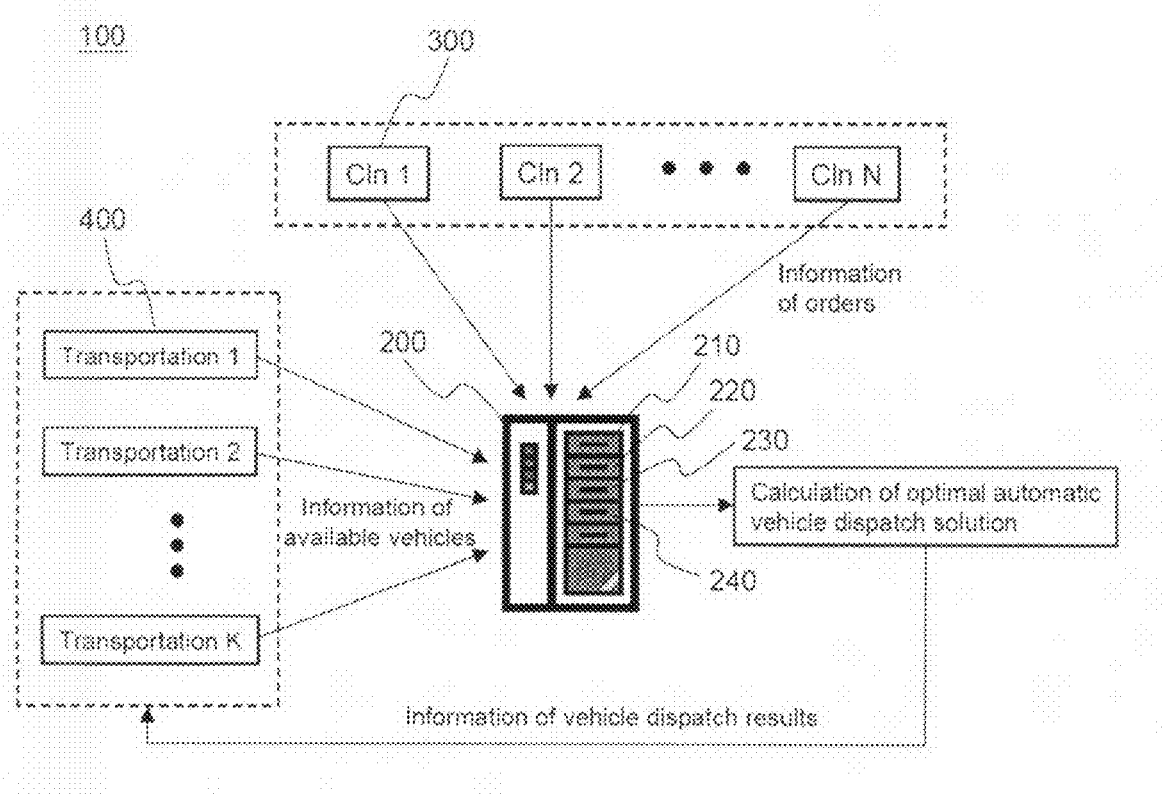
FIG. 2 is a diagram of a system for optimization of integrated automatic vehicle dispatch according to the embodiment of the present invention.
Figure 3:
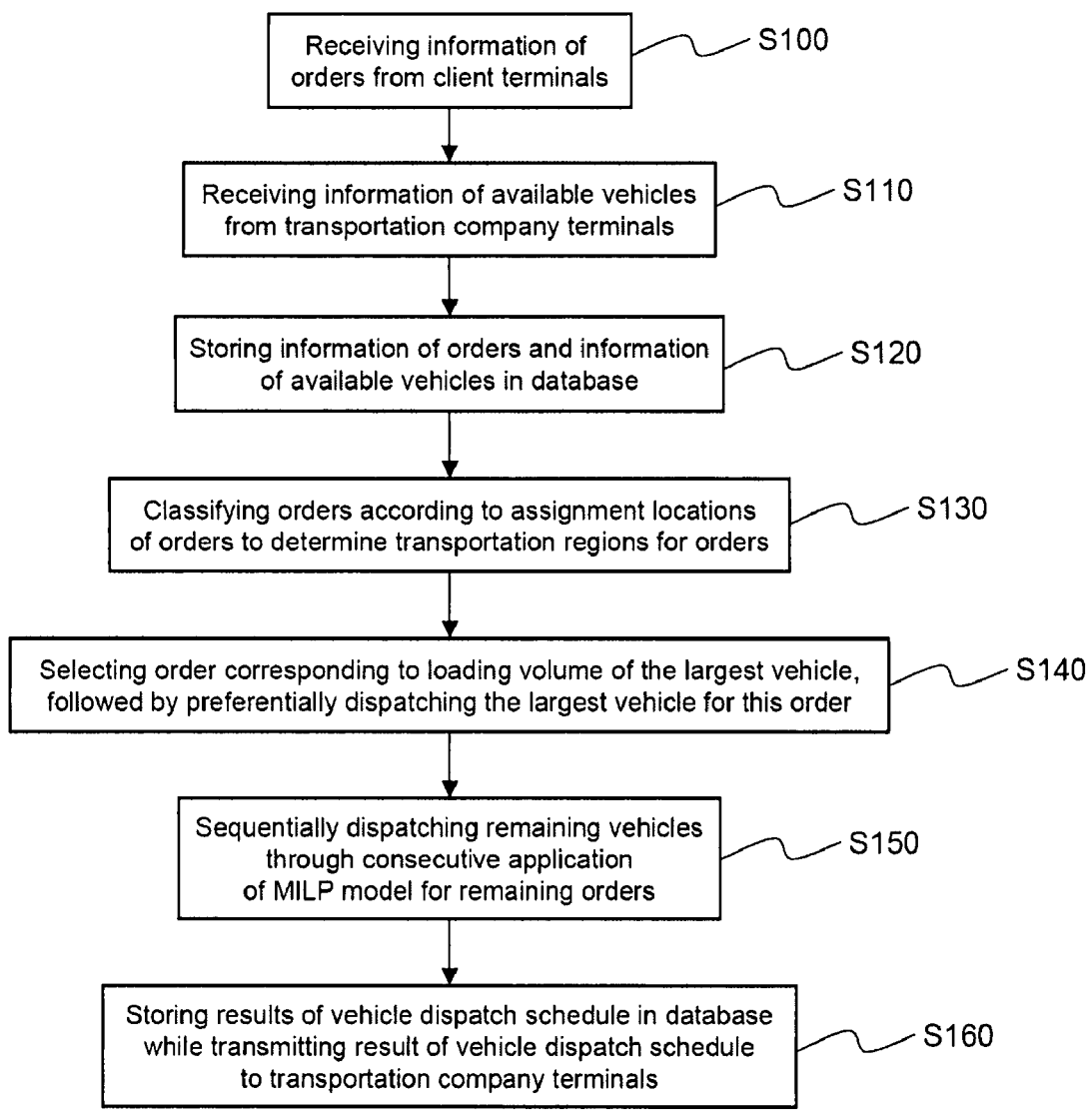
FIG. 3 is a schematic flow chart of one example to which an MILP model is applied to perform the optimization of integrated automatic vehicle dispatch.

In FIG. 2, the construction of an optimal vehicle dispatch system according to an embodiment of the invention is diagrammatically shown, and in FIG. 3, a flow chart of an optimal vehicle dispatch process based on an MILP model according to the embodiment of the invention is shown.

Figure 1:
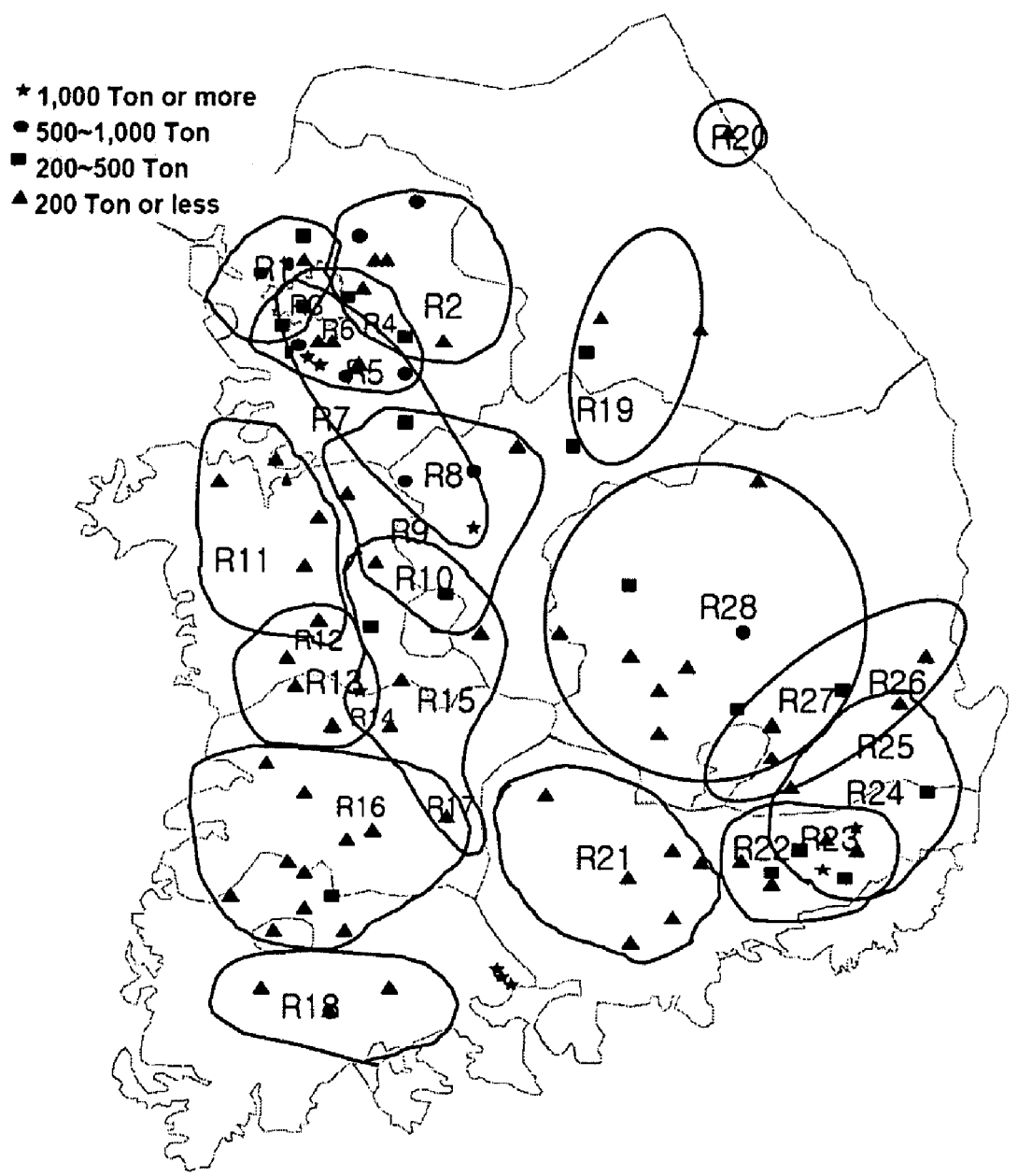
FIG. 1 is a diagram of transportation regions preset according to one embodiment of the present invention.

Referring to FIGS. 1 and 2, the optimal vehicle dispatch system 100 according to the invention comprises a management server for vehicle dispatch 200, client terminals 300, and transportation company terminals 400, in which the client terminals 300 and the transportation company terminals 400 are linked to the management server 200 via Internet.

The client terminals 300 transmit information of orders to the management server 200, whereas the transportation company terminals 400 transmit information of available vehicles to the management server 200. The management server 200 comprises a transportation region database 210, an order information database 220, and an available vehicle information database 230.

When receiving the information of orders from the client terminals 300 (S100), and the information of available vehicles from the transportation company terminals 400 (S110), the management server 200 stores the information of orders and the information of available vehicles in the databases 220 and 230, respectively (S210). Such information receipt is performed through request of the management server 200 to the client terminals 300 and the transportation terminals 400. Transmission and receipt of the information may be performed according to communication protocol preset between the management server 200 and the terminals 300 and 400.

Then, the management server 200 classifies orders in the order information database 220 according to transportation regions based on data of the transportation region database 210 to determine assignment locations (delivery locations) for the orders (S130). Prior to application of an MILP optimal vehicle dispatch model to the orders, orders corresponding to loading volumes of the greatest vehicles among the available vehicles or orders corresponding to the loading volumes of the greatest vehicles among orders for a single transportation region are selected, followed by scheduling preferential vehicle dispatch for these selected orders (S140).

Next, a sequential vehicle dispatch schedule is established through consecutive application of the MILP model to the remaining orders in descending sequence of loading volumes of the vehicles (S150).

The sequential vehicle dispatch schedules are integrated and stored in a vehicle dispatch information database 240, and transmitted to the transportation company terminals 400 (S160), so that respective transportation companies perform vehicle dispatch according to information of the integrated vehicle dispatch schedule transmitted from the vehicle dispatch information database 240.

Figures 4, 5, 6:
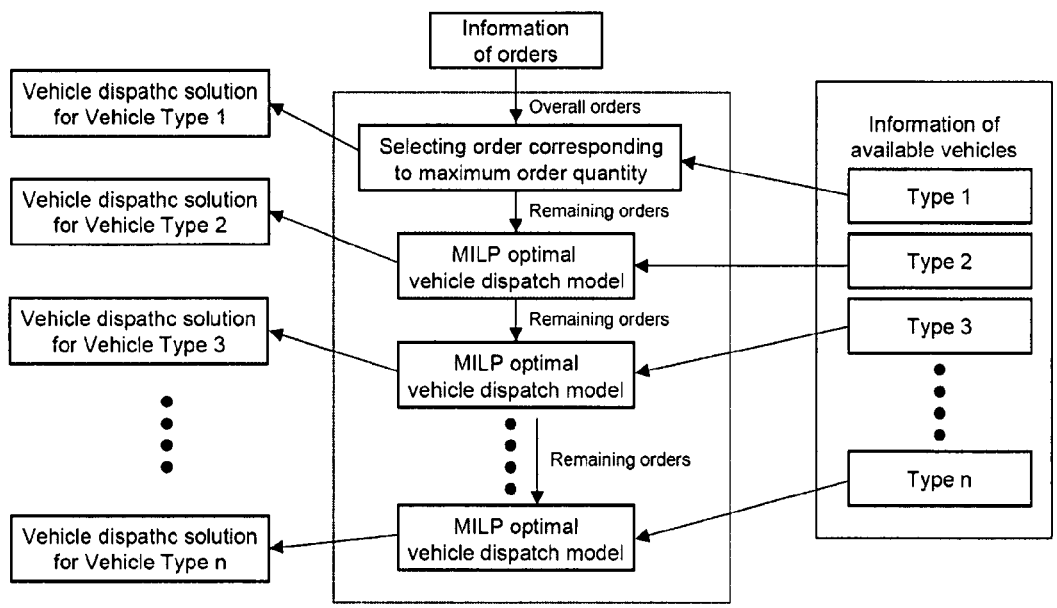
FIG. 4 is a diagram of one example in which an operation for optimal vehicle dispatch is consecutively performed by the MILP model according to one embodiment of the present invention.
FIG. 5 illustrates a binary matrix of information of orders transmitted from client terminals classified into an order item and an assignment location item according to one embodiment of the present invention.
FIG. 6 illustrates a binary matrix classified into the order item and an item for transportation regions to which assignment locations of the orders in FIG. 5 are included, respectively.

In FIG. 4, one example of consecutive optimal vehicle dispatch by the MILP model according to one embodiment of the present invention is diagrammatically shown.

In FIG. 4, Vehicle Type 1 refers to a vehicle having the greatest loading volume, and Vehicle Type n refers to a vehicle having the smallest loading volume among the available vehicles. The optimal vehicle dispatch schedule according to the MILP model is obtained with respect to respective types of vehicles. For vehicles of Vehicle Type 1, the vehicle dispatch is preferentially applied thereto after sorting and selecting orders for a single transportation region which correspond to the loading volumes of the vehicles of Vehicle Type 1, as described above, so that it is possible not only to achieve the vehicle dispatch in consideration of optimal loading volumes, but also to reduce a calculation load of the management server required to perform the MILP model at the subsequent steps.

FIG. 5 shows a binary matrix of information of orders transmitted from client terminals according to one embodiment of the present invention, in which the binary matrix is classified into an order item and an assignment location item.

In FIG. 5, a row indicates an order number, a column indicates an arrangement location number, and "1" or "0" indicates that an order of a corresponding row is given or not given from an arrangement location of a corresponding column. In other words, n orders may be given from m arrangement locations, or multiple orders may be given from a single arrangement location. More specifically, in FIG. 5, orders "1" and "2" are given from an arrangement location "1," an order "3" is given from an arrangement location "2," an order "n−1" is given from an arrangement location "m−1," and an order "n" is given from an arrangement location "m."

FIG. 6 shows a binary matrix, which is classified into an order item and an item of transportation regions to which assignment locations of the orders shown in FIG. 5 are included, respectively.

In FIG. 6, "1" indicates that an order of a corresponding row is given from a transportation region of a corresponding column. More specifically, in FIG. 6, the orders "1" and "2" are given from a transportation region "1," the order "3" is given from a transportation region "2," the order "n−1" is given from a transportation region "k−1," and the order "n" is given from a transportation region "k."

FIG. 7 is a diagram illustrating results of vehicle dispatch with respect to T vehicles by the MILP optimal vehicle dispatch model.

In FIG. 7, each vehicle is dispatched to a single transportation region, which can be superimposed on other transportation regions. For example, a vehicle 1 having the greatest loading volume is dispatched for delivery of orders 1, 2 and 4, all of which are included in a transportation region 1 and among which the order 4 is also included in transportation regions 2 and 3. A vehicle 2 is dispatched for delivery of orders 3 and 6, among which the order 3 is simultaneously included in the transportation regions 1 and 3. Among orders for the transportation region 2, an order 5 is the remaining order, and is scheduled by the following MILP optimal vehicle dispatch model.

FIG. 8 shows binary matrixes of results of vehicle dispatch with respect to the vehicles 1 and 2 among the results of the vehicle dispatch shown in FIG. 7.

In FIGS. 8, the vehicle 1 is dispatched for the orders 1 and 2 included in the transportation region 1, and for the order 4 simultaneously included in the transportation regions 1 and 3. Similarly, the vehicle 2 is dispatched for the order 6 included in the transportation region 2, and for the order 3 simultaneously included in the transportation regions 2 and 3.

Vehicle dispatch was scheduled to deal with 296 orders given from 193 assignment locations included in 28 transportation regions as shown in FIG. 1. A total order quantity was 1786.8 tons, and available vehicles include 45 vehicles, each having a capacity of 25 tons, 39 vehicles, each having a capacity of 18 tons, 32 vehicles, each having a capacity of 15 tons, and 42 vehicles, each having a capacity of 9 tons. The vehicle dispatch was performed by the integrated automatic optimal vehicle dispatch according to the invention, and by a conventional field vehicle dispatch.

Figure 9:
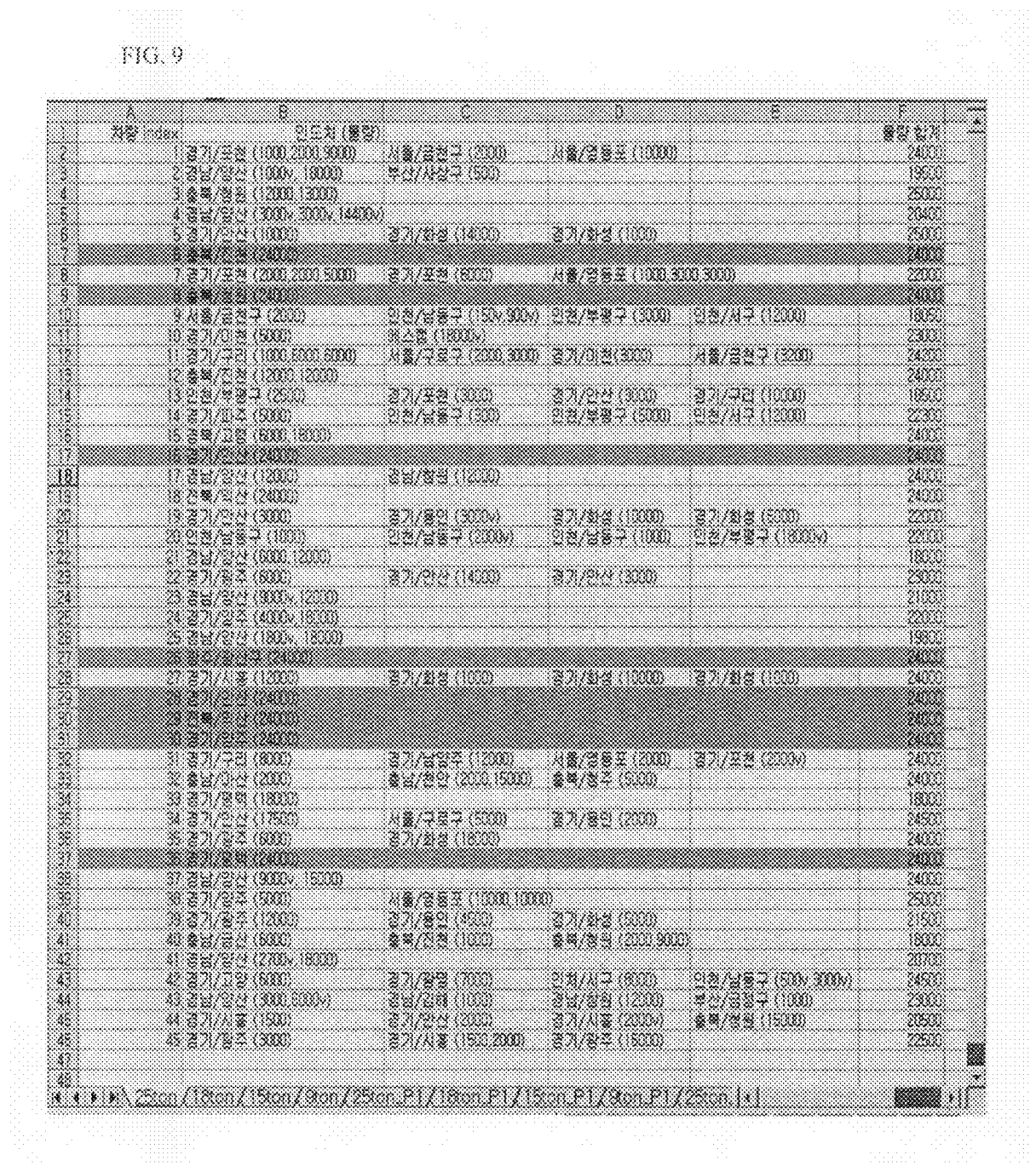

Table 1 shows results of the vehicle dispatch, and, in particular, FIG. 9 shows a result of the vehicle dispatch with respect to 25-ton vehicles.

TABLE 1

| | | Integrated automatic vehicle dispatch of the invention | Field vehicle dispatch of the prior art |
|---|---|---|---|
| Vehicle dispatch | 25 tons | 45 | 45 |
| | 18 tons | 33 | 37 |
| | 15 tons | 24 | 30 |
| | 9 tons | 28 | 38 |
| Total transportation cost | | 4,231 (ten thousand Won) | 4,885 (ten thousand Won) |

As shown in Table 1, it can be understood that the process of the invention could perform the vehicle dispatch with the total number of vehicles reduced in comparison to the field vehicle dispatch of the prior art, which resulted in reduction of about 13% of the total transportation cost.

INDUSTRIAL APPLICABILITY

As apparent from the above description, the system according to the present invention enables vehicle dispatch to be achieved to minimize the total transportation cost for each transportation region by use of information of order transmitted from client terminals and information of available vehicles transmitted from transportation company terminals after effective establishment of transportation regions, so that, in delivery of a plurality of goods to a plurality of relevant assignment locations with a plurality of vehicles, delivery distances of vehicles can be minimized, a loading volume of each vehicle can be increased to reduce an empty rate of the vehicles, and the number of dispatched vehicles can be minimized, thereby significantly reducing a total transportation cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for performing optimal vehicle dispatch, comprising:
    client terminals to supply information of orders;
    transportation company terminals to supply information of available vehicles;
    a management server for vehicle dispatch including a transportation region database, an order information database, an available vehicle information database, and a vehicle dispatch information database to perform optimal vehicle dispatch based on the information of orders from the client terminals and the information of available vehicles from the transportation company terminals; and
    a network for communication between the management server and the client terminals and between the management server and the transportation company terminals,
    wherein the management server for vehicle dispatch performs a process comprising:
    presetting a plurality of transportation regions including individual regions and superimposed regions, based on a transportation time condition and information of a past order quantity and a congestion degree of orders, followed by storing information of the plurality of preset transportation regions in the available vehicle database of the management server;
    receiving the information of orders including an order quantity and an assignment location of each order to store the information of orders in the order information database, and receiving the information of available vehicles including types and the number of available vehicles from the transportation company terminals to store the information of available vehicles in the available vehicle database of the management server;
    establishing a vehicle dispatch schedule optimized in order of high loading volumes of the vehicles under restrictive conditions of vehicle sizes, minimum loading rates, and a maximum number of assignment locations, based on the information of available vehicles and the information of orders, such that a relevant vehicle performs delivery of goods within a predetermined single transportation region to minimize a total transportation cost for each transportation region, followed by storing the vehicle dispatch schedule in the vehicle dispatch information database of the management server; and
    supplying information of the optimized vehicle dispatch schedule in the vehicle dispatch information database to the transportation company terminals.

2. The system according to claim 1, wherein the transportation time condition is set as one of an average transportation time per unit distance and an average transportation distance per unit time in consideration of a road network, traffic volume, and road pavement condition; the information of the past order quantity is set as an average order quantity based on statistics of actual orders for past several years or months; and the information of the congestion degree of orders is set as an average ordering time based on statistics of actual ordering times for the past several years or months.

3. The system according to claim 1, wherein, if a predetermined region has given an average order quantity and/or an average ordering time no less than a predetermined value, the predetermined region is set as the superimposed region to allow conjunctional delivery with other adjacent regions.

4. The system according to claim 1, wherein, if a predetermined region as a city or district unit has given an order quantity no less than a predetermined value per month in the information of the past order quantity, the predetermined region is set as the superimposed transportation region to allow conjunctional delivery with other adjacent regions.

5. The system according to claim 1, wherein, when considering a total order quantity along with the information of the congestion degree of orders, if a predetermined region has given the total order quantity per month no less than a predetermined value, the predetermined region is set as the superimposed transportation region to allow conjunctional delivery with other adjacent regions.

6. The system according to claim 1, wherein the vehicle sizes determine the maximum number of goods to be loaded on the vehicles; the minimum loading rate is set to allow a loading volume of each vehicle to be a predetermined value or more; and the maximum number of assignment locations is set to suggest a predetermined number or less of assignment locations that can be circulated by one vehicle.

7. The system according to claim 1, wherein, if an order quantity for one assignment location approaches 100% of a loading volume of a vehicle having the maximum loading volume among the available vehicles, the vehicle having the maximum loading volume is preferentially dispatched to the one assignment location.

8. The system according to claim 7, wherein, if a total order quantity for 2~4 assignment locations within a single transportation region approaches 100% of the loading volume of the vehicle having the maximum loading volume among the available vehicles, the vehicle having the maximum loading volume is preferentially dispatched to the single transportation region.

9. The system according to claim 1, wherein the step of establishing the optimized vehicle dispatch schedule is determined according to a mixed integer linear programming (MILP) model including linear equations expressed by the restrictive conditions, and an objective function for minimization of the total transportation costs.

10. The system according to claim 9, wherein the MILP model is deduced by obtaining a solution of the vehicle dispatch schedule to maximize an objective function (obj) expressed by Equation 1, the objective function being directed to preferential employment of large vehicles with relatively high loading volumes and low transportation charges, $$obj = \sum_{i,t,k} OD(i) BTM(i, t, k), \quad (1)$$

where "i" denotes an order, "t" denotes a vehicle, "k" denotes a transportation region, "BTM(i,t,k)" is 0 or 1, and OD(i) denotes an order quantity of an i-th order.

* * * * *